US010991263B2

(12) United States Patent
Tsai (10) Patent No.: US 10,991,263 B2
(45) Date of Patent: Apr. 27, 2021

(54) INSTRUCTIONAL METHOD AND SYSTEM OF AN ELECTRONIC KEYBOARD, INSTRUCTIONAL ELECTRONIC KEYBOARD, AND A STORAGE MEDIUM

(71) Applicant: Jia-Yu Tsai, Taipei (TW)

(72) Inventor: Jia-Yu Tsai, Taipei (TW)

( * ) Notice: Subject to any disclaimer, the term of this patent is extended or adjusted under 35 U.S.C. 154(b) by 0 days.

(21) Appl. No.: 16/749,918

(22) Filed: Jan. 22, 2020

(65) Prior Publication Data

US 2020/0327820 A1 Oct. 15, 2020

(30) Foreign Application Priority Data

Apr. 10, 2019 (CN) .......................... 201910286203.4

(51) Int. Cl.
| | |
|---|---|
| *G09B 15/02* | (2006.01) |
| *G09B 15/08* | (2006.01) |
| *G09B 15/04* | (2006.01) |
| *G10H 1/36* | (2006.01) |
| *G06F 3/02* | (2006.01) |
| *G10H 1/00* | (2006.01) |

(52) U.S. Cl.
CPC .............. *G09B 15/023* (2013.01); *G06F 3/02* (2013.01); *G09B 15/04* (2013.01); *G09B 15/08* (2013.01); *G10H 1/0016* (2013.01); *G10H 1/365* (2013.01); *G10H 2220/031* (2013.01)

(58) Field of Classification Search
CPC ...... G09B 15/023; G09B 15/04; G09B 15/08; G10H 1/0016; G10H 1/365
See application file for complete search history.

(56) References Cited

U.S. PATENT DOCUMENTS

| | | | | |
|---|---|---|---|---|
| 3,478,159 A | * | 11/1969 | Olson .................... | G09B 15/08 84/719 |
| 3,610,086 A | * | 10/1971 | Decker .................. | G09B 15/08 84/470 R |
| 3,827,330 A | * | 8/1974 | Ward ................... | G09B 15/023 84/472 |
| 4,331,062 A | * | 5/1982 | Rogers ................. | G09B 15/023 84/470 R |
| 4,366,741 A | * | 1/1983 | Titus .................... | G09B 15/023 248/921 |
| 4,893,540 A | * | 1/1990 | Friedmar ............... | G09B 5/067 353/74 |
| 5,107,743 A | * | 4/1992 | Decker .................. | G09B 15/08 84/478 |

(Continued)

*Primary Examiner* — Robert W Horn
(74) *Attorney, Agent, or Firm* — Bayramoglu Law Offices LLC (57) ABSTRACT

An instructional method of an electronic keyboard includes the following steps: obtaining a playing script, wherein the playing script is generated by a recording electronic keyboard; the recording electronic keyboard generates the playing script according to a pressed second key and the time of pressing the second key, and the playing script is used for indicating a corresponding relationship between a to-be-pressed key and the time of pressing the to-be-pressed key; controlling an indicator light on the first key of the instructional electronic keyboard to be turned on/off according to the playing script. In this implementation mode, a user can be prompted for the key by an indicator light on the electronic keyboard, which facilitates the user to learn the electronic keyboard.

15 Claims, 3 Drawing Sheets

(56) References Cited

U.S. PATENT DOCUMENTS

| | | | | |
|---|---|---|---|---|
| 5,521,323 A * | 5/1996 | Paulson | G10H 1/361 | 84/610 |
| 5,656,789 A * | 8/1997 | Nakada | G09B 15/003 | 84/477 R |
| 5,728,960 A * | 3/1998 | Sitrick | G10G 1/00 | 84/477 R |
| 6,069,310 A * | 5/2000 | James | G10H 1/0058 | 84/622 |
| 6,350,942 B1 * | 2/2002 | Thomson | G09B 15/002 | 84/477 R |
| 7,074,999 B2 * | 7/2006 | Sitrick | G09B 15/023 | 84/477 R |
| 7,129,408 B2 * | 10/2006 | Uehara | G10H 1/0066 | 84/645 |
| 7,323,633 B2 * | 1/2008 | Shaffer | G10H 1/0016 | 84/464 A |
| 7,693,746 B2 * | 4/2010 | Wachi | G06Q 30/0601 | 705/26.8 |
| 7,989,689 B2 * | 8/2011 | Sitrick | G09B 15/023 | 84/723 |
| 8,901,405 B1 * | 12/2014 | McCarthy | G09B 15/023 | 84/478 |
| 9,082,313 B1 * | 7/2015 | McCarthy | G09B 15/023 | |
| 9,857,934 B2 * | 1/2018 | Humphrey | G06F 3/0481 | |
| 9,953,545 B2 * | 4/2018 | Matahira | G10H 1/365 | |
| 10,008,190 B1 * | 6/2018 | Elson | G09B 15/00 | |
| 10,410,614 B2 * | 9/2019 | Elson | G10H 1/0008 | |
| 2006/0112814 A1 * | 6/2006 | Paepcke | G10H 1/0066 | 84/645 |
| 2006/0123976 A1 * | 6/2006 | Both | H04L 47/22 | 84/600 |
| 2008/0041217 A1 * | 2/2008 | Knudsen | G09B 15/023 | 84/464 R |
| 2010/0184497 A1 * | 7/2010 | Cichowlas | A63F 13/814 | 463/7 |
| 2015/0332601 A1 * | 11/2015 | Tamari | G09B 15/003 | 84/485 R |
| 2020/0027367 A1 * | 1/2020 | McCarthy | G09B 5/14 | |
| 2020/0327820 A1 * | 10/2020 | Tsai | G10H 1/0058 | |

* cited by examiner

INSTRUCTIONAL METHOD AND SYSTEM OF AN ELECTRONIC KEYBOARD, INSTRUCTIONAL ELECTRONIC KEYBOARD, AND A STORAGE MEDIUM

CROSS REFERENCE TO THE RELATED APPLICATIONS

This application is based upon and claims priority to Chinese Patent Application No. 201910286203.4, filed on Apr. 10, 2019, the entire contents of which are incorporated herein by reference.

TECHNICAL FIELD

The present disclosure relates to the technical field of musical instruments, more particularly, to an instructional method and system for an electronic keyboard, an instructional electronic keyboard, and a storage medium.

BACKGROUND

The electronic keyboard is an electronic instrument having an adjustable volume for sound. The electronic keyboard has a wide range of sounds and chords that can give an instrumental performance, using the various keys and chords that can mimic the sound of an orchestra. The fact that a keyboard with these capabilities can perform this type of music is enormously expressive. Furthermore, the electronic keyboard can also imitate a variety of timbres and even produce sounds (e.g. chorus, wind and rain sounds, synthetic sound, and others) that conventional musical instruments cannot produce. When playing a solo, the electronic keyboard can optionally cooperate the rhythm accompaniments such as the sounds of percussion instruments, which is suitable for playing modern music with strong rhythmicity. Moreover, the electronic keyboard is provided with an effect unit (such as reverberation, echo, tenuto), a vibrato unit, a modulation unit, and other multifunctional devices, which can easily play the various emotive expressions.

However, the keyboard of prior art, has problems. Ordinary people need to spend a great deal of money and time on learning how to operate an electronic keyboard. For example, it takes a lot of time and effort to go to music lessons, which directly contributes to lack of learning efficiency.

SUMMARY

The objective of the present disclosure is to provide an instructional method and system of an electronic keyboard, an instructional electronic keyboard, and a storage medium, so that a user can be prompted to press the key by an indicator light on the electronic keyboard, which facilitates the user to learn how to operate the electronic keyboard.

In order to solve the above-mentioned technical problems, the embodiment of the present disclosure provides an instructional method for the electronic keyboard, including the following steps: obtaining a playing script, wherein the script is generated by a recording electronic keyboard, wherein the recording electronic keyboard generates the playing script according to a pressed second key and the time of pressing the second key, and the playing script is used for indicating a corresponding relationship between a to-be-pressed key and the time of pressing the to-be-pressed key; controlling an indicator light on a first key of the instructional electronic keyboard to be turned on/off according to the playing script.

The embodiment of the present disclosure further provides an instructional system for the electronic keyboard, including: the instructional electronic keyboard and the recording electronic keyboard. The recording electronic keyboard generates a playing script according to its own pressed second key which is pressed and the time of pressing the second key, and the playing script is used for indicating the corresponding relationship between the to-be-pressed key and the time of pressing the to-be-pressed key. The instructional electronic keyboard obtains the playing script and controls the indicator light on the first key of the instructional electronic keyboard to be turned on/off according to the playing script.

The embodiment of the present disclosure further provides an instructional electronic keyboard, including: an acquisition module, a control module, and the first key. The first key is provided with an indicator light. The acquisition module is configured to obtain the playing script, and the playing script is generated by the recording electronic keyboard. The recording electronic keyboard generates the playing script according to its own pressed second key and the time of pressing the second key. The playing script is used for indicating the corresponding relationship between the to-be-pressed key and the time of pressing the to-be-pressed key. The control module is used for controlling the indicator light on the first key of the instructional electronic keyboard to be turned on/off according to the playing script.

The embodiment of the present disclosure further provides the instructional electronic keyboard, including: at least one processor, a memory connected to the at least one processor in a communication manner, and a communication component. The communication component is controlled by the processor to receive and transmit data. The memory stores instructions which can be executed by the at least one processor. When the instructions are executed by the at least one processor, the at least one processor can execute the instructional method of the electronic keyboard mentioned in the above-mentioned embodiment.

The embodiment of the present disclosure further provides a computer readable storage medium, and a computer program is stored in the computer readable storage medium. When the computer program is executed by the processor, the instructional method of the electronic keyboard mentioned in the above-mentioned embodiment is achieved.

Compared with the prior art, the instructional electronic keyboard, according to the embodiment of the present disclosure, can prompt the user to press the to-be-pressed key, alleviating any burdens of the user the need to recite musical notations. Since the recording electronic keyboard can generate the playing script, the instructional electronic keyboard can acquire and execute the playing script generated by the recording electronic keyboard, and can control the indicator light on the first key of the instructional electronic keyboard to be illuminated. As a result, the user can play a musical composition by observing changes of the indicator light on the instructional electronic keyboard, which enables the user to learn how to play the electronic keyboard.

Further, the step of controlling the indicator light on the first key of the instructional electronic keyboard to be turned on/off according to the playing script, specifically includes: determining the currently to-be-pressed first key according to the playing script and the time at which the playing starts;

and controlling the indicator light corresponding to the currently to-be-pressed first key to be illuminated.

Further, a virtual canvas matched with the instructional electronic keyboard is stored in the instructional electronic keyboard, and the virtual canvas includes N elements. There is a one-to-one correspondence between the N elements on the virtual canvas and indicator lights on the instructional electronic keyboard, wherein N is a positive integer. The playing script includes M key events, each key event records the time point of pressing the key and the to-be-pressed key at the time point. The step of controlling the indicator light on the first key of the instructional electronic keyboard to be turned on/off according to the playing script, specifically includes: successively executing each key event in the playing script according to a sequence of time points recorded by the key event when the keys are pressed. During the executing process of each key event, the following operations are performed respectively: adjusting the elements in the virtual canvas according to a preset prompt rule and the key event, wherein the adjusted virtual canvas instructs the indicator light on the first key of the instructional electronic keyboard to be illuminated according to the prompt rule, so as to prompt the user to press the to-be-pressed key at the time point of pressing the key; and driving the indicator light on the first key of the instructional electronic keyboard to be illuminated according to the elements in the virtual canvas. In this implementation mode, the indicator lights are controlled by the virtual canvas, which reduces the influence of each key event on one another under a complex situation and reduces the system burden.

Further, the prompt rule is as follows: controlling the indicator lights on the to-be-pressed keys to be illuminated in sequence according to a preset lighting sequence; alternatively, according to the preset lighting sequence, controlling the indicator light of the to-be-pressed keys, the indicator lights of the first C keys of the to-be-pressed keys, and the indicator lights of the last C keys of the to-be-pressed keys to be illuminated; wherein, C is a positive integer and C is less than half of the number of the first keys.

Further, each element in the virtual canvas is a number, each first key is provided with T indicator lights, T is a positive integer greater than 1. The prompt rule is as follows: according to the preset lighting sequence, controlling the T indicator lights on the to-be-pressed keys to be illuminated in sequence. The elements in the virtual canvas are adjusted according to the key events, specifically including: according to the key event, determining the to-be-pressed first key; determining the elements in the virtual canvas corresponding to the T indicator lights of the to-be-pressed first key; according to the preset prompt rule, dynamically adjusting values of the elements corresponding to the T indicator lights of the to-be-pressed first key in the virtual canvas. The indicator light on the first key of the instructional electronic keyboard is driven to be illuminated according to the elements in the virtual canvas, specifically including: according to the values of the elements in the virtual canvas, lighting an indicator light corresponding to an element whose value is not 0, and extinguishing an indicator light corresponding to an element whose value is 0. In this implementation mode, the user can determine the time of pressing the first key according to the prompt rule of the T indicator lights on the first key.

Further, the playing script is transmitted to a second terminal by the recording electronic keyboard and then is transmitted to the cloud server by the second terminal. The playing script is obtained, specifically including: obtaining the playing script sent by a first terminal; wherein the first terminal determines a musical composition, acquires the playing script from the cloud server, and transmits the playing script to the instructional electronic keyboard. In this implementation mode, the manufacturing cost of the instructional electronic keyboard is reduced.

Further, in the process of controlling the indicator light on the first key of the instructional electronic keyboard to be turned on/off according to the playing script, the instructional method of the electronic keyboard further includes: recording the pressed first key and the time of pressing the first key in real time. After the indicator light on the first key of the instructional electronic keyboard is controlled to be turned on/off according to the playing script, the instructional method of the electronic keyboard further includes: after determining that the playing is completed, according to the recorded pressed first key and the recorded time of pressing the first key, generating a practice script; transmitting the practice script to the first terminal, wherein the practice script and the playing script are compared by the first terminal, and a playing score is determined and displayed according to a comparison result. In this implementation mode, users can objectively know their own ability of playing the electronic keyboard.

Further, the instructional system of the electronic keyboard further includes: the first terminal, the second terminal, and the cloud server. The recording electronic keyboard is also used for transmitting the playing script to the second terminal after generating the playing script according to its own pressed second key and the time of pressing the second key. The second terminal is used for transmitting the playing script to the cloud server. The cloud server is used for storing the playing script. The first terminal is used for obtaining the playing script from the cloud server and transmitting the playing script to the instructional electronic keyboard.

BRIEF DESCRIPTION OF THE DRAWINGS

One or more embodiments are illustratively described by the corresponding figures in the drawings, and these exemplary descriptions are not intended to constitute a limitation on the embodiments. Components with the same reference numerals in the drawings are denoted as similar components, and the drawings do not constitute a limitation on the scale unless specifically stated.

DETAILED DESCRIPTION OF THE EMBODIMENTS

In order to accomplish the objectives, technical solutions and advantages of the embodiments of the present disclosure, the various embodiments of the present disclosure will be expressly illustrated hereinafter with reference to the drawings. However, those having ordinary skill in the art can understand that, a number of technical details are proposed in the various embodiments of the present disclosure for a better understanding of the present application. However, the technical solutions that the present application seeks to protect can be realized even without these technical details and various changes and modifications based on the following embodiments.

It should be noted that those skilled in the art can understand that the instructional method of the electronic keyboard provided by the embodiments of the present disclosure can be applied to various scenarios using the electronic keyboard, e.g. teaching scenarios of the electronic keyboard and entertainment scenarios of the electronic keyboard (e.g. playing competitions, or games based on the electronic keyboard, etc.).

Figure 1:
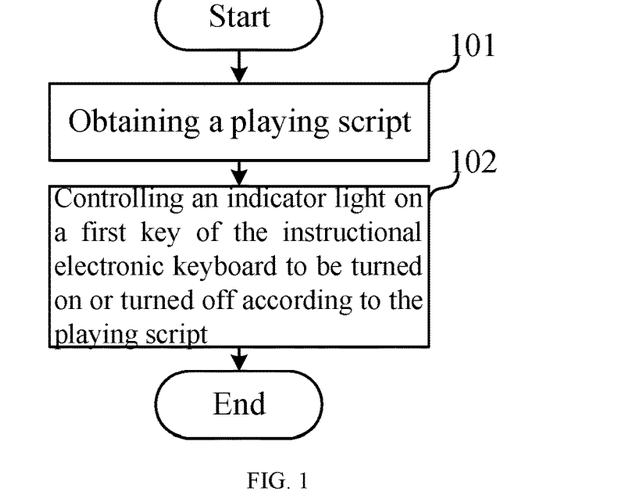
FIG. 1 is a flow chart showing the instructional method of the electronic keyboard according to the first embodiment of the present disclosure.

The first embodiment of the present disclosure relates to the instructional method of the electronic keyboard, which is applied to the instructional electronic keyboard. As shown in FIG. 1, the instructional method of the electronic keyboard includes the following steps.

Step 101: the playing script is obtained.

Specifically, the playing script is generated by the recording electronic keyboard. The recording electronic keyboard generates the playing script according to the pressed second key and the time of pressing the second key. The playing script is used for indicating the corresponding relationship between the to-be-pressed key and the time of pressing the to-be-pressed key.

The process of generating the playing script by the recording electronic keyboard is illustrated as follows.

After the recording electronic keyboard starts recording, the pressed second key is read in real time according to an inductive signal generated by a press sensing circuit board. The time of pressing the second key is determined, and the pressed second key and the time of pressing the second key are recorded in a script file. After the recording of the recording electronic keyboard ends, the playing script is generated according to the script file.

For example, the recording electronic keyboard is provided with a reading module, a recording button, a stop button, and a press sensing circuit board. When the user A records a musical composition, the following operations are performed. The user A presses the recording button of the recording electronic keyboard before playing the musical composition, and plays the musical composition by the recording electronic keyboard. The reading module reads the inductive signal generated by the press sensing circuit board after determining that the recording button is pressed. For example, at the first moment, the reading module receives the first inductive signal, and the first inductive signal indicates that the second key corresponding to the note Do is pressed, and the current time is the $1^{st}$ second after the recording button is pressed. Meanwhile, "the $1^{st}$ second Do" is recorded in the script file. At the second moment, the reading module receives the second inductive signal, and the second inductive signal indicates the second key corresponding to the note Re is pressed, and the current time is the $2^{nd}$ second after the recording button is pressed. Meanwhile, "the $2^{nd}$ second Re" is recorded in the script file. At the third moment, the reading module receives the third inductive signal, and the third inductive signal indicates the second key corresponding to the note Fa is pressed, and the current time is the $3^{rd}$ second after the recording button is pressed. Meanwhile, "the $3^{rd}$ second Fa" is recorded in the script file. The user A presses the stop button after finishing the playing. After the recording electronic keyboard detects that the stop button is pressed, the playing script is generated according to the script file, and the information recorded in the playing script is "the $1^{st}$ second Do, the $2^{nd}$ second Re, the $3^{rd}$ second Fa . . . ".

It should be noted that those skilled in the art can understand and determine to start recording and stop recording by other methods. For example, the method of determining to stop recording includes the following. The recording electronic keyboard determines that no second key is detected within the first preset time, and thus determines that the playing of the musical composition is completed and stops recording. The first preset time can be set as needed, e.g. 1 minute. The present embodiment does not limit how the recording electronic keyboard determines the time of starting the recording and the time of stopping the recording.

The method of obtaining the playing script by the instructional electronic keyboard is illustrated as follows.

Method 1:

The instructional electronic keyboard establishes a communication connection to the recording electronic keyboard, and the playing script is sent to the instructional electronic keyboard by the recording electronic keyboard.

In the first example, the user who uses the recording electronic keyboard to play is a teacher, and the user who uses the instructional electronic keyboard is a student who is learning the electronic keyboard. The recording electronic keyboard establishes a communication connection to a plurality of instructional electronic keyboards. The recording electronic keyboard sends the playing script to all instructional electronic keyboards connected to the recording electronic keyboard after generating the playing script, so that each student can follow the teacher to learn the electronic keyboard by observing the on-off state of the indicator light on the instructional electronic keyboard.

In the second example, the recording electronic keyboard and G instructional electronic keyboards are respectively connected to the cloud server, wherein G is a positive integer. The recording electronic keyboard generates the playing script in real time according to the pressed second key and the time of pressing the second key, and sends the playing script to the cloud server, and the cloud server broadcasts the playing script. The G instructional electronic keyboards connected to the cloud terminal server receive the broadcast of the cloud server, obtains the playing script, and controls the indicator light to be turned on/off according to the playing script.

In addition, the recording electronic keyboard is connected to a plurality of instructional electronic keyboards, so that the plurality of instructional electronic keyboards can prompt the keys which need to be pressed, which is convenient for the one-to-many teaching.

Method 2:

The instructional electronic keyboard establishes a communication connection to the first terminal, and the recording electronic keyboard establishes a communication connection to the second terminal. The playing script is transmitted to the second terminal by the recording electronic keyboard, and then is transmitted to the cloud server by the second terminal. The playing script sent by the first terminal is obtained by the instructional electronic keyboard, wherein the first terminal determines the musical composition, acquires the playing script from the cloud server, and transmits the playing script to the instructional electronic keyboard.

In one example, the playing script recorded by the recording electronic keyboard is the playing script of the musical composition. The instructional electronic keyboard is connected to the first terminal through Bluetooth, and the recording electronic keyboard is connected to the second terminal through Bluetooth. The recording electronic keyboard uploads the playing script and information of the musical composition to the cloud server through a Bluetooth device after generating the playing script of the musical composition. The information of the musical composition includes but is not limited to the name of the musical composition. The cloud server records the playing script of the musical composition and the information of the musical composition in the memory of the cloud server, and publishes the recorded information of the musical composition. The first terminal acquires login information of the user, generates a first request according to the login information of the user, and sends the first request to the cloud server. The first request instructs the cloud server to return the recorded information of the musical composition. The cloud server receives the first request, and verifies the login information of the user in the first request. If the cloud server determines that the login information of the user is authenticated, then the first response information is sent to the first terminal, and the first response information includes the recorded information of the musical composition. If it is determined that the login information of the user is not authenticated, then the second response information is sent to the first terminal, and the second response information indicates that the login information of the user has an error. If the first response information is received by the first terminal, the recorded information of the musical composition in the first response information is displayed. If the second response information is received by the first terminal, the user is prompted for an error of the login information. The first terminal determines the information of the musical composition selected by the user after displaying the recorded information of the musical composition in the first response information. The first terminal determines a second request according to the information of the musical composition selected by the user, and the second request instructs the cloud server to return a playing script corresponding to the information of the musical composition selected by the user. The second request is sent to the cloud server by the first terminal. The cloud server receives the second request and sends the third response information to the first terminal. The third response information includes a playing script corresponding to the information of the musical composition selected by the user. The first terminal receives the third response information and sends the playing script corresponding to the information of the musical composition selected by the user to the instructional electronic keyboard.

In another example, the information of the musical composition further includes price information of the musical composition, and the second request further includes payment information of the user. The playing script corresponding to the information of the musical composition selected by the user is sent to the first terminal by the cloud server provided that the cloud server determines the payment information of the user and indicates that the user has paid.

In addition, after the playing script of the musical composition is obtained from the first terminal, the playing script of the musical composition is transmitted to the instructional electronic keyboard through Bluetooth, which can reduce the functions of the instructional electronic keyboard and reduce the cost of the instructional electronic keyboard.

Step 102: According to the playing script, the indicator light on the first key of the instructional electronic keyboard is controlled to be turned on/off.

The method of controlling the indicator light on the first key to be turned on/off by the instructional electronic keyboard according to the playing script is illustrated as follows.

Method A:

The instructional electronic keyboard determines the currently to-be-pressed first key and the time of starting playing the keyboard according to the playing script, and controls the indicator light corresponding to the currently to-be-pressed first key to be illuminated. For example, the playing script instructs that the key corresponding to the note Fa is pressed in the third second, and the key corresponding to the note So is pressed in the fifth second. According to the time of starting the playing, when the playing has currently continued for 5 seconds, then the indicator light of the first key corresponding to the note So is illuminated, and the indicator lights of other first keys are extinguished.

Method B:

A virtual canvas matched with the instructional electronic keyboard is stored in the instructional electronic keyboard, wherein the virtual canvas includes N elements, the elements on the virtual canvas correspond to the indicator lights on the instructional electronic keyboard one by one, and N is a positive integer. The playing script includes M key events, the time point of pressing the key and the to-be-pressed key at the time point are recorded in each key event. The M key events are arranged in the sequence of the time points of pressing the keys. The indicator light on the first key of the instructional electronic keyboard is controlled to be turned on/off according to the playing script, which specifically includes that each key event in the playing script is executed successively according to the sequence of the time points recorded by the key events when the keys are pressed. During the process of executing each key event, the following operations are performed respectively. The elements in the virtual canvas are adjusted according to the preset prompt rule and the key event, wherein the adjusted virtual canvas instructs the indicator light on the first key to be illuminated according to the prompt rule, so as to prompt the user to press the to-be-pressed key at the time point of the key. According to the elements in the virtual canvas, the indicator light on the first key of the instructional electronic keyboard is driven to be illuminated.

In should be noted that the prompt rule includes, but is not limited to: (1) The indicator lights on the to-be-pressed keys are controlled to be illuminated in sequence according to the preset lighting sequence. (2) According to the preset lighting sequence, the indicator light of the to-be-pressed key, the indicator light of the first C keys of the to-be-pressed key, and the indicator lights of the last C keys of the to-be-pressed key are controlled to be illuminated, Wherein C is a positive integer and C is less than half of the number of the first keys. The present embodiment does not limit the implication of the prompt rule.

In one example, each element in the virtual canvas is a number, and the numeric value of the number represents a brightness value of the indicator light corresponding to a number position. Each key event also records the pressing duration of the to-be-pressed key. The process of adjusting the elements in the virtual canvas by the instructional electronic keyboard according to the key event is as follows. The instructional electronic keyboard determines the to-be-pressed first key and the pressing duration of the to-be-pressed first key according to the key event. A target value of the element corresponding to the indicator light of the to-be-pressed first key is determined according to the pressing duration of the to-be-pressed first key. The value of the element in the virtual canvas corresponding to the indicator light of the to-be-pressed first key is adjusted to the target value.

For example, assuming that a constraint relationship between the target value of the element and the pressing duration of the key is the target value of the element=(the pressing duration of the key)*L, wherein the unit of the pressing duration of the key is seconds, and L can be set as required, e.g. 20. When the pressing duration of the key is 2 seconds, the target value of the element is 40.

In another example, each element in the virtual canvas is a number, and each first key is provided with T indicator lights, wherein T is a positive integer greater than 1. The prompt rule is as follows. According to the preset lighting sequence, the T indicator lights on the to-be-pressed keys are controlled to be illuminated in sequence. The process of adjusting the elements in the virtual canvas by the instructional electronic keyboard according to the key event is as follows. According to the key event, the to-be-pressed first key is determined. The elements in the virtual canvas corresponding to the T indicator lights of the to-be-pressed first keys are determined. According to the prompt rule, the value of the element in the virtual canvas corresponding to the T indicator lights of the to-be-pressed first key is dynamically adjusted. The process of driving the indicator light on the first key of the instructional electronic keyboard to be illuminated by the instructional electronic keyboard according to the element in the virtual canvas is as follows. According to the value of the element in the virtual canvas, the indicator light corresponding to the element whose value is not 0 is illuminated, and the indicator light corresponding to the element whose value is 0 is extinguished.

Specifically, since each element of the virtual canvas is a number, the virtual canvas is equivalent to a matrix of numbers, and the relative positional relationship between elements is the same as the relative positional relationship between the indicator lights. Assuming that each of the first keys of the instructional electronic keyboard is provided with five indicator lights. For example, the forms of the first key corresponding to the note Do, the first key corresponding to the note Re, and the first key corresponding to the note Mi are shown in the virtual canvas as below.

| 0 | 0 | 0 |
|---|---|---|
| 0 | 0 | 0 |
| 0 | 0 | 0 |
| 0 | 0 | 0 |
| 0 | 0 | 0 |

The changes of the virtual canvas are enumerated with different prompt rules.

In the first case, according to the preset lighting sequence, the indicator lights on the keys which need to be pressed are controlled to be illuminated in sequence.

In one example, the preset prompt rule is as follows. The T indicator lights of the keys are illuminated successively from top to bottom in the first P seconds of the time point of the key, and the lighting time of each indicator light is $P/(T-1)$ seconds. Thus, the virtual canvas is updated once every $P/(T-1)$ seconds, and the value of the element in the virtual canvas corresponding to the indicator light that needs to be illuminated is set as Q, wherein Q is a positive number.

Assuming that the key event indicates that the first key corresponding to the note Do needs to be pressed in the $10^{th}$ second, when T=5 and Q=250, in the $(10-P)^{th}$ second, the elements in the virtual canvas are adjusted as follows.

| 250 | 0 | 0 |
|---|---|---|
| 0 | 0 | 0 |
| 0 | 0 | 0 |
| 0 | 0 | 0 |
| 0 | 0 | 0 |

In the $(10-P+P/4)^{th}$ second, the elements in the virtual canvas are adjusted as follows.

| 0 | 0 | 0 |
|---|---|---|
| 250 | 0 | 0 |
| 0 | 0 | 0 |
| 0 | 0 | 0 |
| 0 | 0 | 0 |

In the $(10-P+2P/4)^{th}$ second, the elements in the virtual canvas are adjusted as follows.

| 0 | 0 | 0 |
|---|---|---|
| 0 | 0 | 0 |
| 250 | 0 | 0 |
| 0 | 0 | 0 |
| 0 | 0 | 0 |

In the $(10-P+3P/4)^{th}$ second, the elements in the virtual canvas are adjusted as follows.

| 0 | 0 | 0 |
|---|---|---|
| 0 | 0 | 0 |
| 0 | 0 | 0 |
| 250 | 0 | 0 |
| 0 | 0 | 0 |

In the $10^{th}$ second, the elements in the virtual canvas are adjusted as follows.

| 0 | 0 | 0 |
|---|---|---|
| 0 | 0 | 0 |
| 0 | 0 | 0 |
| 0 | 0 | 0 |
| 250 | 0 | 0 |

Based on the above description, by using the instructional method of the electronic keyboard provided in the present embodiment, the user can be prompted to press a key that is about to be pressed and the time point of pressing the key before the time point of pressing the key.

In one example, the lighting state of the solid key is controlled by a light emitting diode (LED) driving module in the instructional electronic keyboard according to the value of the element in a virtual canvas.

In should be noted that those skilled in the art can understand, in practical applications, the preset prompt rule can be adjusted according to the needs. For example, the preset prompt rule can be the following. The T indicator lights of the keys are illuminated successively from bottom to top in the first P seconds of the time point of the key, and the lighting time of each indicator light is $P/(T-1)$ seconds. The preset prompt rule can also be that the indicator lights are illuminated from both ends to the middle.

In another example, a preset prompt rule is as follows. The T indicator lights of the keys are illuminated in sequence from top to bottom in the first P seconds. The virtual canvas is updated once every P/(T−1) seconds. In the $k^{th}$ process of updating the virtual canvas, the value of the element corresponding to the newly-illuminated indicator light in the $k^{th}$ updating process is set to Q, the value of the element corresponding to the newly-illuminated indicator light in the $(k-1)^{th}$ updating process is set to Q-B, and the value of the element corresponding to the indicator light that needs to be illuminated in the $(k-2)^{th}$ updating process is set to Q−2B, and so on, where k is less than T, Q is a positive number greater than B, and B is a positive number.

Assuming that the key event indicates that the first key corresponding to the note Do needs to be pressed in the $10^{th}$ second, when T=5, Q=250, and B=50, in the $(10-P)^{th}$ second, the elements in the virtual canvas are adjusted as follows.

| 250 | 0 | 0 |
|---|---|---|
| 0 | 0 | 0 |
| 0 | 0 | 0 |
| 0 | 0 | 0 |
| 0 | 0 | 0 |

In the $(10-P+P/4)^{th}$ second, the elements in the virtual canvas are adjusted as follows.

| 200 | 0 | 0 |
|---|---|---|
| 250 | 0 | 0 |
| 0 | 0 | 0 |
| 0 | 0 | 0 |
| 0 | 0 | 0 |

In the $(10-P+2P/4)^{th}$ second, the elements in the virtual canvas are adjusted as follows.

| 150 | 0 | 0 |
|---|---|---|
| 200 | 0 | 0 |
| 250 | 0 | 0 |
| 0 | 0 | 0 |
| 0 | 0 | 0 |

In the (10−P+3P/4) second, the elements in the virtual canvas are adjusted as follows.

| 100 | 0 | 0 |
|---|---|---|
| 150 | 0 | 0 |
| 200 | 0 | 0 |
| 250 | 0 | 0 |
| 0 | 0 | 0 |

In the $10^{th}$ second, the elements in the virtual canvas are adjusted as follows.

| 50 | 0 | 0 |
|---|---|---|
| 100 | 0 | 0 |
| 150 | 0 | 0 |
| 200 | 0 | 0 |
| 250 | 0 | 0 |

In the second case, the prompt rule is as follows. According to the preset lighting sequence, the indicator light of the to-be-pressed key, the indicator light of the to-be-pressed first C keys, and the indicator lights of the to-be-pressed last C keys are controlled to be illuminated.

Assuming that the key event indicates that the first key corresponding to the note Mi needs to be pressed in the $10^{th}$ second, C=2, and each of the first keys has five indicator lights. The elements in the virtual canvas from the first key corresponding to the note Do to the first key corresponding to the note So are as follows.

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |

The lighting sequence is as follows.

In the $(10-P)^{th}$ second, the virtual canvas is updated and the elements in the virtual canvas are adjusted as follows.

| 250 | 0 | 0 | 0 | 250 |
|---|---|---|---|---|
| 0 | 0 | 0 | 0 | 0 |
| 0 | 0 | 0 | 0 | 0 |
| 0 | 0 | 0 | 0 | 0 |
| 250 | 0 | 0 | 0 | 250 |

In the $(10-P+P/2)^{th}$ second, the virtual canvas is updated and the elements in the virtual canvas are adjusted as follows.

| 200 | 0 | 0 | 0 | 200 |
|---|---|---|---|---|
| 0 | 250 | 0 | 250 | 0 |
| 0 | 0 | 0 | 0 | 0 |
| 0 | 250 | 0 | 250 | 0 |
| 200 | 0 | 0 | 0 | 200 |

In the $10^{th}$ second, the virtual canvas is updated and the elements in the virtual canvas are adjusted as follows.

| 150 | 0 | 0 | 0 | 150 |
|---|---|---|---|---|
| 0 | 200 | 0 | 200 | 0 |
| 0 | 0 | 250 | 0 | 0 |
| 0 | 200 | 0 | 200 | 0 |
| 150 | 0 | 0 | 0 | 150 |

It should be noted that the lighting sequence of the indicator lights can be set as needed, and the present embodiment does not limit the lighting sequence of the indicator lights.

It should be noted that those skilled in the art can understand, in practical applications, the elements in the virtual canvas can also be other identifiers in addition to numbers, and the present embodiment does not limit the form of elements in the virtual canvas.

In addition, in one example, the advantages of using the virtual canvas to control the indicator lights are as follows.

(1) As for the situation that multiple key events occur at the same time, if the indicator lights are respectively controlled by the key events, which may cause interference between the special effects (i.e., the effect of the indicator lights which are illuminated in sequence) generated by the execution of each key event, and destroy the special effects. The special effects are unitedly displayed on the virtual canvas, which can realize the centralized management of all special effects, and the special effects are less likely to destroy one another when superimposed.

(2) If the indicator lights are directly controlled by the key events, it would be time-consuming. When the indicator lights are controlled by the system, which takes much more time than processing the virtual canvas. The special effects generated by all key events are unitedly displayed on the virtual canvas, and the patterns of the virtual canvas are displayed on the indicator light in sequence, which reduces the burden of the system.

It should be noted that the above is only an illustrative description, which is not intended to limit the technical solution of the present disclosure.

Compared with the prior art, in the present embodiment, since the user can be prompted by the instructional electronic keyboard to press the key that needs to be pressed when playing the musical composition, the instructional method of the electronic keyboard reduces the pressure on the user of reciting musical notations. Since the recording electronic music can generate the playing script, and the instructional electronic keyboard can acquire and execute the playing script generated by the recording electronic keyboard and control the indicator light on the first key of the instructional electronic keyboard to be illuminated, so that the user can play a musical composition by observing the changes of the indicator lights on the instructional electronic keyboard, which is convenient for the user to learn the electronic keyboard. In addition, the instructional electronic keyboard can change the indicator light of the first key which needs to be pressed according to the preset prompt rule and remind the user of the time of pressing the first key. The instructional electronic keyboard can prompt the user for the time length of pressing the first key according to the brightness of the indicator light.

The second embodiment of the present disclosure relates to an instructional method of the electronic keyboard. The present embodiment provides further improvements on the basis of the first embodiment, and the specific improvements are as follows. During the playing process, the pressed first keys and the time of pressing the first key are recorded in real time, so as to determine the playing score of the user.

Figure 2:
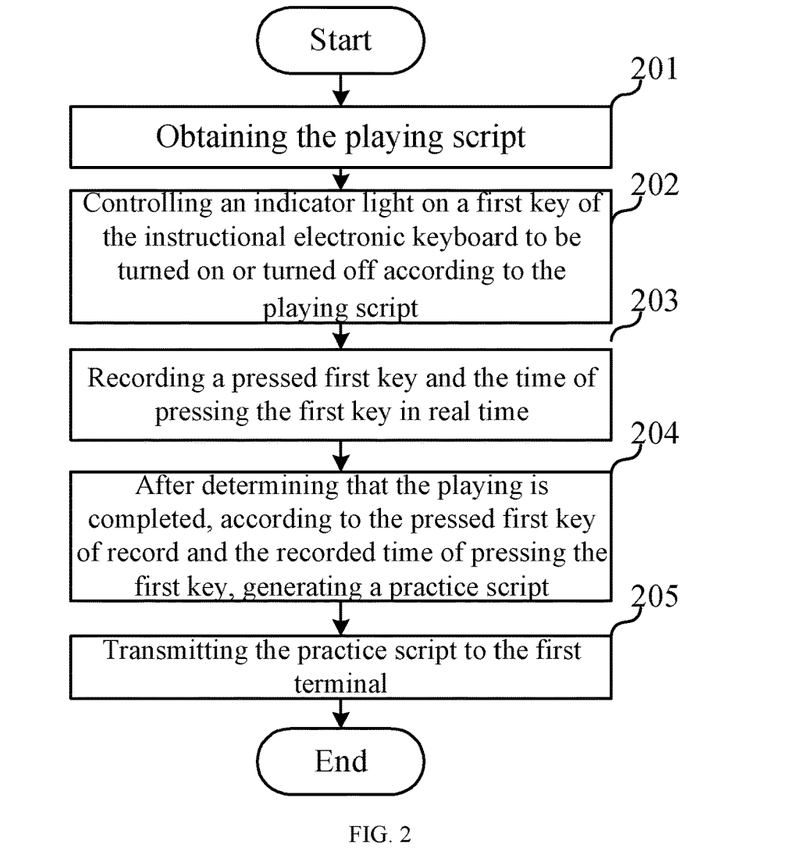
FIG. 2 is a flow chart showing the instructional method of the electronic keyboard according to the second embodiment of the present disclosure.

Specifically, as shown in FIG. 2, the present embodiment includes steps 201 to 205, wherein step 201 and step 202 are substantially the same as step 101 and step 102 in the first embodiment, respectively, and are not repeatedly described herein. The following is mainly the differences thereof.

Step 201: The playing script is obtained.

Step 202: According to the playing script, the indicator light on the first key of the instructional electronic keyboard is controlled to be turned on/off.

Step 203: The pressed first key and the time of pressing the first key are recorded in real time.

Specifically, the instructional electronic keyboard starts recording the first key pressed by the user and the time of pressing the first key after determining that the user starts playing.

It should be noted that, in order to expressly illustrate the present embodiment, step 203 is used as a follow-up step of step 202, in practical applications, those skilled in the art can understand, step 202 and step 203 can be performed at the same time, and the present embodiment does not limit the sequence of step 202 and step 203.

Step 204: The practice script is generated according to the recorded pressed first key and the time of pressing the pressed first key after determining that the playing is completed.

Specifically, the method of generating the practice script by the instructional electronic keyboard is similar to the method of generating the playing script by the recording electronic keyboard in the first embodiment, which is not described repeatedly. Those skilled in the art can perform this step with reference to the relevant contents in the first embodiment.

Step 205: The practice script is transmitted to the first terminal.

Specifically, the first terminal compares the practice script and the playing script after receiving the practice script, and then determines and displays the playing score according to the comparison result.

For example, when the playing starts, the instructional electronic keyboard firstly detects that the first key corresponding to the note Do is pressed by the user, determines a first time point at which the first key corresponding to the note Do is pressed by the user, and generates a first practice event, wherein the first time point and the first key corresponding to note Do are recorded in the first practice event. When instructional electronic keyboard detects that the first key corresponding to the note Do and the first key corresponding to the note Mi are pressed by the user at the same time, determines a second time point at which the first key corresponding to the note Do and the first key corresponding to the note Mi are pressed, and generates a second practice event . . . . After the user finishes playing, the instructional electronic keyboard generates a practice script according to each recorded practice event, and each recorded event in the practice script is arranged according to the sequence in which the practice events occur. The practice script is sent to the first terminal by the instructional electronic keyboard. The first terminal sets the playing score to be 100 and performs the following operations for each practice event in the practice script. It is determined whether there is a key event in the playing script that is the same as the information recorded in the practice event, if yes, the playing score is not changed; if no, 100/M is subtracted from the playing score.

In addition, the practice script of the user is compared with the playing script, so that users can understand their own playing ability.

It should be noted that the above is only an illustrative description, which is not intended to limit the technical solution of the present disclosure.

Compared with the prior art, since the user can be prompted by the instructional electronic keyboard to press the to-be-pressed key when playing the musical composition, the instructional method of the electronic keyboard provided in the present embodiment reduces the pressure on the user of reciting musical notations. Since the recording electronic keyboard can generate the playing script, and the instructional electronic keyboard can acquire and execute the playing script generated by the recording electronic keyboard, control the indicator light on the first key of the instructional electronic keyboard to be illuminated, so that the user can play a musical composition by observing the change of the indicator light on the instructional electronic keyboard, which is convenient for the user to learn the electronic music instrument. Besides, the musical composition played by the user is recorded by the instructional electronic keyboard and is sent to the first terminal for scoring, so that the user knows the playing level.

The steps of the above-mentioned methods are divided in order to provide a clear description, and the steps can be combined into one step; or some steps can be separated and divided into multiple steps. The steps would fall within the scope of protection of this patent if the steps include the same logical relationship. Insignificant modifications added to the algorithm or the process or insignificant designs introduced to the algorithm or the process without changing the core design of the algorithm and the process would fall within the scope of protection of this invention.

Figure 3:
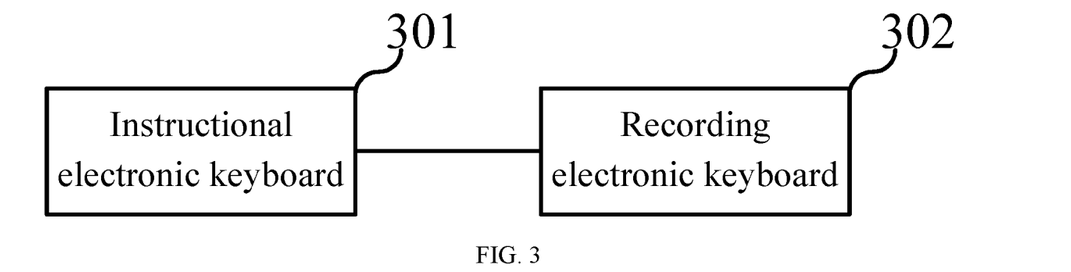
FIG. 3 is a block diagram showing the instructional system of the instructional electronic keyboard according to the third embodiment of the present disclosure.

The third embodiment of the present disclosure relates to an instructional system of the electronic keyboard, as shown in FIG. 3, including: the instructional electronic keyboard 301 and the recording electronic keyboard 302. The recording electronic keyboard 302 generates the playing script according to the pressed second key and the time of pressing the second key. The playing script is configured to indicate the corresponding relationship between the to-be-pressed key and the time of pressing the to-be-pressed key. The playing script is obtained by the instructional electronic keyboard 301. According to the playing script, the indicator light on the first key of the instructional electronic keyboard is controlled to be turned on/off.

Figure 4:
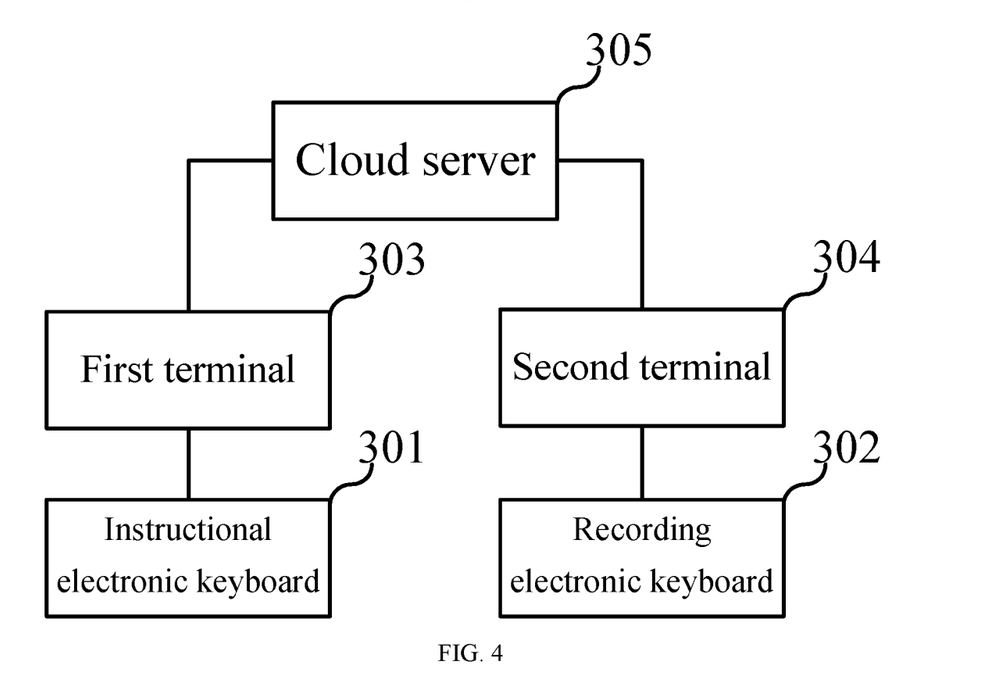
FIG. 4 is a block diagram showing the instructional system of the electronic keyboard according to the third embodiment of the present disclosure.

In an example, the instructional system of the electronic keyboard as shown in FIG. 4 further includes: the first terminal 303, the second terminal 304, and the cloud server 305. The recording electronic keyboard 302 is also configured to transmit the playing script to the second terminal 304 after generating the playing script according to its own pressed second key and the time of pressing the second key. The second terminal 304 is configured to transmit the playing script to the cloud server 305. The cloud server 305 is configured to store the playing script. The first terminal 303 is configured to obtain the playing script from the cloud server 305 and transmit the playing script to the instructional electronic keyboard 301.

In an example, the instructional system of the electronic keyboard includes: the recording electronic keyboard and G instructional electronic keyboards, wherein the recording electronic keyboard and the G instructional electronic keyboards are connected to the cloud server, respectively, wherein G is a positive integer. The recording electronic keyboard generates the playing script in real time according to its own pressed second key and the time of pressing the second key, and sends the playing script to the cloud server. The cloud server broadcasts the playing script. The G instructional electronic keyboards connected to the cloud server receive the broadcast from the cloud server, obtain the playing script, and control the indicator light to be turned on/off according to the playing script so as to realize the real-time teaching.

Obviously, the present embodiment is a system embodiment corresponding to the first embodiment, and the present embodiment can be implemented in cooperation with the first embodiment. The related technical details mentioned in the first embodiment are still effective in the present embodiment, which are not repeatedly described herein. Accordingly, the related technical details mentioned in the present embodiment can also be applied in the first embodiment.

In addition, each module referring to in the present embodiment is a logic module. In practical applications, a logical unit may be a physical unit, or a part of the physical unit, or a combination of a plurality of physical units. Besides, in order to focus on the creative part of the present disclosure, units without a close bond to solving the technical problem proposed by the present disclosure are not introduced in the present embodiment, while this does not mean that there are no other units in the present embodiment.

Figure 5:
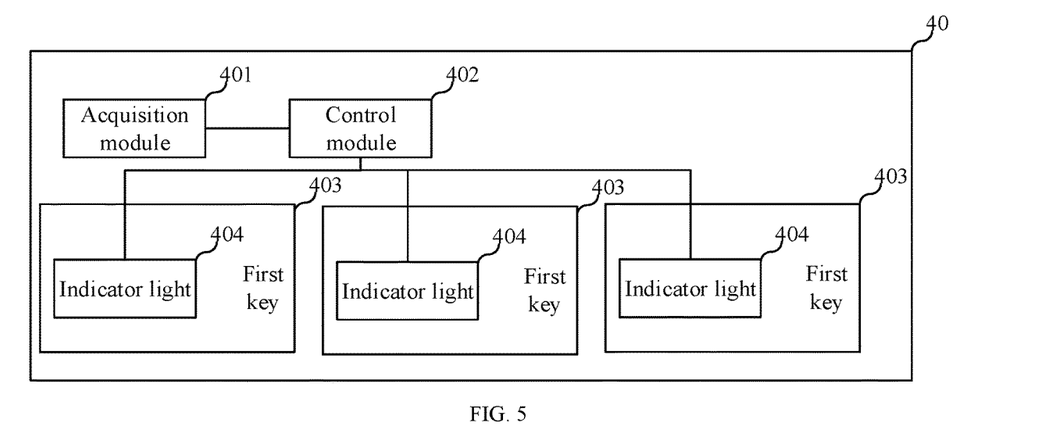
FIG. 5 is a block diagram showing the instructional electronic keyboard according to the fourth embodiment of the present disclosure.

The fourth embodiment of the present disclosure relates to the instructional electronic keyboard 40, as shown in FIG. 5, including: the acquisition module 401, the control module 402, and the first key 403. The first key 403 is provided with the indicator light 404. The acquisition module 401 is configured to obtain the playing script, and the playing script is generated by the recording electronic keyboard. The recording electronic keyboard generates the playing script according to its own pressed second key and the time of pressing the second key. The playing script is configured to indicate a corresponding relationship between the to-be-pressed key and the time of pressing the to-be-pressed key. The control module 402 is configured to control the indicator light 404 on the first key of the instructional electronic keyboard to be turned on/off according to the playing script.

It should be noted that those skilled in the art can understand that the recording electronic keyboard can be other electronic keyboards in addition to the instructional electronic keyboard, or can be the instructional electronic keyboard itself.

It should be noted that those skilled in the art can understand the following. For example, as shown in FIG. 5, the instructional electronic keyboard 40 includes three first keys 403, and each first key 403 includes the indicator light 404. In practical applications, the number of indicator lights of the instructional electronic keyboard 40 may be other positive integers, and the number of indicator lights on each first key 403 may also be multiple. The present embodiment does not limit the number of the first keys 403 and the number of the indicator lights 404 on each of the first keys 403.

Obviously, the present embodiment is a device embodiment corresponding to the first embodiment, and the present embodiment can be implemented in cooperation with the first embodiment. The related technical details mentioned in the first embodiment are still effective in the present embodiment, which are not repeatedly described herein. Accordingly, the related technical details mentioned in the present embodiment can also be applied in the first embodiment.

In addition, each module referring to the present embodiment is a logic module. In practical applications, a logical unit may be a physical unit, or a part of the physical unit, or a combination of a plurality of physical units. In addition, in order to focus on the creative part of the present disclosure, units without a close bond to solving the technical problem proposed by the present disclosure are not introduced in the present embodiment, while this does not mean that there are no other units in the present embodiment.

Figure 6:
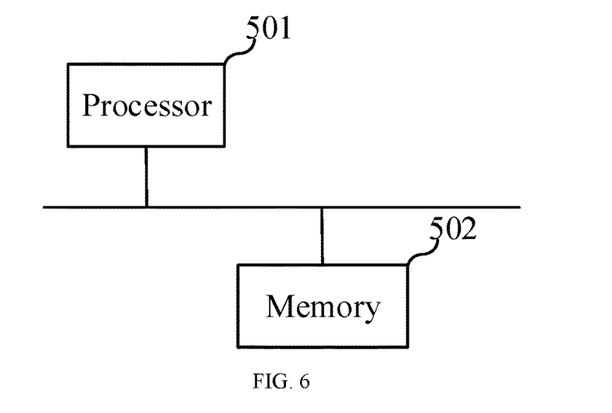
FIG. 6 is a block diagram showing the instructional electronic keyboard according to the fifth embodiment of the present disclosure.

The fifth embodiment of the present disclosure relates to the instructional electronic keyboard, as shown in FIG. 6, including: at least one processor 501, the memory 502 connected to the at least one processor 501 in a communication manner, and the communication component 503. The communication component 503 receives and sends data under the control of the processor 501. The memory 502 stores instructions capable of being executed by the at least one processor 501. The instructions are executed by the at least one processor 501, so that the at least one processor 501 can execute the instructional method of the electronic keyboard mentioned in the foregoing embodiment.

The electronic keyboard includes: one or more processors 501 and the memory 502. As shown in FIG. 6, the electronic keyboard includes one processor 501. The processor 501 and the memory 502 can be connected through a bus or other methods. As shown in FIG. 6, the processor 501 and the memory 502 are connected through a bus. The memory 502 is a non-volatile computer-readable storage medium and thus can be configured to store non-volatile software programs, non-volatile computer executable programs, and modules. The processor 501 executes various functional applications and data processing of the device by running non-volatile software programs, instructions, and modules stored in the memory 502, thereby realizing the instructional method of the electronic keyboard described above.

The memory 502 may include a program storage area and a data storage area, wherein the program storage area can store an operating system and an application program required for at least one function. The data storage area can store an option list and others. In addition, the memory 502 may include a high-speed random access memory, or a non-volatile memory, e.g. at least one magnetic disk storage device, a flash memory device, or other non-volatile solid-state memory devices. In some embodiments, the memory 502 includes a memory remotely set relative to the processor 501, and these remote memories may be connected to an external device through a network. The above-mentioned network embodiments include, but are not limited to, the Internet, an intranet, a local area network, a mobile communication network, and combinations thereof.

One or more modules are stored in the memory 502, the instructional method of the electronic keyboard in any of the above-mentioned method embodiments is performed when one or more modules are executed by one or more processors 501.

The above-mentioned product can execute the method provided by the embodiments of the present application, and has the corresponding functional modules and advantages of executing the method. The technical details not described in the present embodiment can refer to the method provided in the embodiments of the present application.

The sixth embodiment of the present disclosure relates to a computer-readable storage medium storing a computer program. The computer program is executed by the processor to achieve the method embodiment mentioned above.

Namely, those skilled in the art can understand that the program is configured to instruct related hardware to achieve all or part of the steps in the method of the foregoing embodiment. The program is stored in a storage medium, and includes a plurality of instructions to allow a device (e.g. a single-chip microcomputer, a chip, or others) or a processor to execute all or part of the steps of the method described in the various embodiments of the present application. The aforementioned storage medium includes: a USB flash drive, a mobile hard disk, a read-only memory (ROM), a random access memory (RAM), a magnetic disk or an optical disk, and other mediums that can store program codes.

Those having ordinary skills in the art can understand that the foregoing embodiments are specific embodiments for achieving the present disclosure. However, in practical applications, various changes can be made to the form and the details of these embodiments without departing from the spirit and scope of the present disclosure.

What is claimed is:

1. An instructional method of an electronic keyboard for an instructional electronic keyboard, comprising the following steps:

obtaining a playing script, wherein the recording electronic keyboard generates the playing script according to a pressed second key and a time point of pressing the pressed second key, wherein the pressed second key is owned by the recording electronic keyboard; and the playing script is configured to instruct a corresponding relationship between a to-be-pressed key and a time point of pressing the to-be-pressed key; and controlling an indicator light on a first key of the instructional electronic keyboard to be turned on or turned off according to the playing script;

a virtual canvas is stored in and is matched with the instructional electronic keyboard, the virtual canvas comprises N elements, there is a one-to-one correspondence between the N elements on the virtual canvas and indicator lights on the instructional electronic keyboard, and N is a positive integer; the playing script comprises M key events, each of the M key events records the time point of pressing the to-be-pressed key and the to-be-pressed key at the time point;

the step of controlling the indicator light on the first key of the instructional electronic keyboard to be turned on or turned off according to the playing script comprises:

successively executing each of the M key events in the playing script according to a sequence of time points recorded by the M key events when keys are pressed; and when each of the M key events is executed, the instructional method further comprises:

adjusting the N elements in the virtual canvas according to a preset prompt rule and the M key events, wherein an adjusted virtual canvas instructs the indicator light on the first key of the instructional electronic keyboard to be illuminated according to the preset prompt rule, to prompt the user to press the to-be-pressed key at the time point of the to-be-pressed key;

driving the indicator light on the first key of the instructional electronic keyboard to be illuminated according to the N elements in the virtual canvas.

2. The instructional method of the electronic keyboard according to claim 1, wherein, the preset prompt rule comprises:

controlling the indicator lights on to-be-pressed keys to be illuminated in sequence according to a preset lighting sequence; alternatively, according to the preset lighting sequence, controlling the indicator light of the to-be-pressed key, the indicator lights of first C keys of the to-be-pressed key, and the indicator lights of last C keys of the to-be-pressed key to be illuminated; C is a positive integer and C is less than half of a number of the first keys.

3. The instructional method of the electronic keyboard according to claim 2, wherein, each element in the virtual canvas is a number, each of the first keys is provided with T indicator lights, T is a positive integer greater than 1; the preset prompt rule comprises:

according to the preset lighting sequence, controlling the T indicator lights on the to-be-pressed key to be illuminated in sequence; and the step of adjusting the elements in the virtual canvas according to the M key events comprises:

according to the M key events, determining the to-be-pressed first key;

determining the N elements in the virtual canvas corresponding to the T indicator lights of the to-be-pressed first key;

according to the preset prompt rule, dynamically adjusting values of the N elements corresponding to the T indicator lights of the to-be-pressed first key in the virtual canvas; and the step of driving the indicator light on the first key of the instructional electronic keyboard to be illuminated according to the elements in the virtual canvas comprises:

according to the values of the N elements in the virtual canvas, turning on an indicator light corresponding to a first element, wherein a value of the first element is not 0; and turning off an indicator light corresponding to a second element, wherein a value of the second element is 0.

4. The instructional method of the electronic keyboard according to claim 1, wherein, the playing script is a playing script of a musical composition, the playing script of the musical composition is transmitted to a second terminal by the recording electronic keyboard and is transmitted to a cloud server by the second terminal; and the step of obtaining the playing script of the musical composition comprises:

obtaining the playing script of the musical composition sent by a first terminal; wherein the first terminal determines the musical composition, acquires the playing script of the musical composition from the cloud server, and transmits the playing script of the musical composition to the instructional electronic keyboard.

5. The instructional method of the electronic keyboard according to claim 4, wherein, in the process of controlling the indicator light on the first key of the instructional electronic keyboard to be turned on or turned off according to the playing script, the instructional method of the electronic keyboard further comprises:

recording a pressed first key and a time point of pressing the pressed first key in real time;

after the indicator light on the first key of the instructional electronic keyboard is controlled to be turned on or turned off according to the playing script, the instructional method of the electronic keyboard further comprises:

after determining that the playing is completed, according to the pressed first key and the time point of pressing the pressed first key, generating a practice script, wherein the pressed first key and the time point of pressing the pressed first key are recorded; and transmitting the practice script to the first terminal, wherein the practice script and the playing script are compared by the first terminal, and a playing score is determined and displayed according to a comparison result.

6. An instructional system of an electronic keyboard for carrying out the method of claim 1, comprising: an instructional electronic keyboard and a recording electronic keyboard;

the recording electronic keyboard generates a playing script according to a pressed second key and a time point of pressing the pressed second key, wherein the pressed second key is owned by the recording electronic keyboard; and the playing script is configured to instruct a corresponding relationship between a to-be-pressed key and a time point of pressing the to-be-pressed key; and the playing script is obtained by the instructional electronic keyboard; an indicator light on a first key of the instructional electronic keyboard is controlled to be turned on or turned off according to the playing script.

7. The instructional system of the electronic keyboard according to claim 6, wherein, the instructional system of the electronic keyboard further comprises a first terminal, a second terminal, and a cloud server;

the recording electronic keyboard is configured to transmit the playing script to the second terminal after generating the playing script according to the pressed second key and the time point of pressing the pressed second key;

the second terminal is configured to transmit the playing script to the cloud server;

the cloud server is configured to store the playing script; and the first terminal is configured to obtain the playing script from the cloud server and transmit the playing script to the instructional electronic keyboard.

8. An instructional electronic keyboard for carrying out the method of claim 1, comprising: an acquisition module, a control module, and a first key, wherein the first key is provided with an indicator light;

the acquisition module is configured to obtain a playing script, and the playing script is generated by a recording electronic keyboard; wherein, the recording electronic keyboard generates the playing script according to the pressed second key and a time point of pressing the pressed second key, wherein the pressed second key is owned by the recording electronic keyboard; the playing script is configured to instruct a corresponding relationship between a to-be-pressed key and a time point of pressing the to-be-pressed key; and the control module is configured to control the indicator light on the first key of the instructional electronic keyboard to be turned on or turned off according to the playing script.

9. An instructional electronic keyboard, comprising: at least one processor;

a memory, wherein the memory is connected to the at least one processor in a communication manner; and a communication component, wherein the communication component receives and transmits data under a control of the at least one processor; and the memory stores instructions, wherein the instructions are configured to be executed by the at least one processor; when the instructions are executed by the at least one processor, the at least one processor executes the instructional method of the electronic keyboard according to claim 1.

10. A non-transitory computer readable storage medium, wherein, a computer program is stored in the non-transitory computer readable storage medium; when the computer program is executed by a processor, the instructional method of the electronic keyboard according to claim 1 is achieved.

11. The instructional method of the electronic keyboard according to claim 2, wherein, the playing script is a playing script of a musical composition, the playing script of the musical composition is transmitted to a second terminal by the recording electronic keyboard and is transmitted to a cloud server by the second terminal; and the step of obtaining the playing script of the musical composition comprises:

obtaining the playing script of the musical composition sent by a first terminal; wherein the first terminal determines the musical composition, acquires the playing script of the musical composition from the cloud server, and transmits the playing script of the musical composition to the instructional electronic keyboard.

12. The instructional method of the electronic keyboard according to claim 3, wherein, the playing script is a playing script of a musical composition, the playing script of the musical composition is transmitted to a second terminal by the recording electronic keyboard and is transmitted to a cloud server by the second terminal; and the step of obtaining the playing script of the musical composition comprises:

obtaining the playing script of the musical composition sent by a first terminal; wherein the first terminal determines the musical composition, acquires the playing script of the musical composition from the cloud server, and transmits the playing script of the musical composition to the instructional electronic keyboard.

13. The instructional method of the electronic keyboard according to claim 1, wherein, in the process of controlling the indicator light on the first key of the instructional electronic keyboard to be turned on or turned off according to the playing script, the instructional method of the electronic keyboard further comprises:

recording a pressed first key and a time point of pressing the pressed first key in real time;

after the indicator light on the first key of the instructional electronic keyboard is controlled to be turned on or turned off according to the playing script, the instructional method of the electronic keyboard further comprises:

after determining that the playing is completed, according to the pressed first key and the time point of pressing the pressed first key, generating a practice script, wherein the pressed first key and the time point of pressing the pressed first key are recorded; and transmitting the practice script to the first terminal, wherein the practice script and the playing script are compared by the first terminal, and a playing score is determined and displayed according to a comparison result.

14. The instructional method of the electronic keyboard according to claim 11, wherein, in the process of controlling the indicator light on the first key of the instructional electronic keyboard to be turned on or turned off according to the playing script, the instructional method of the electronic keyboard further comprises:

recording a pressed first key and a time point of pressing the pressed first key in real time;

after the indicator light on the first key of the instructional electronic keyboard is controlled to be turned on or turned off according to the playing script, the instructional method of the electronic keyboard further comprises:

after determining that the playing is completed, according to the pressed first key and the time point of pressing the pressed first key, generating a practice script, wherein the pressed first key and the time point of pressing the pressed first key are recorded; and transmitting the practice script to the first terminal, wherein the practice script and the playing script are compared by the first terminal, and a playing score is determined and displayed according to a comparison result.

15. The instructional method of the electronic keyboard according to claim 12, wherein, in the process of controlling the indicator light on the first key of the instructional electronic keyboard to be turned on or turned off according to the playing script, the instructional method of the electronic keyboard further comprises:

recording a pressed first key and a time point of pressing the pressed first key in real time;

after the indicator light on the first key of the instructional electronic keyboard is controlled to be turned on or turned off according to the playing script, the instructional method of the electronic keyboard further comprises:

after determining that the playing is completed, according to the pressed first key and the time point of pressing the pressed first key, generating a practice script, wherein the pressed first key and the time point of pressing the pressed first key are recorded; and transmitting the practice script to the first terminal, wherein the practice script and the playing script are compared by the first terminal, and a playing score is determined and displayed according to a comparison result.

* * * * *